March 23, 1954 R. O. TARDIFF Re. 23,806

COMBINATION PACKAGE

Original Filed Nov. 22, 1949

Inventor

Ray O. Tardiff.

By William S. Nordberg

Attorney

Reissued Mar. 23, 1954

Re. 23,806

UNITED STATES PATENT OFFICE 23,806

COMBINATION PACKAGE

Ray O. Tardiff, Pennington, N. J., assignor to Breyer Ice Cream Company, Philadelphia, Pa., a corporation of Delaware Original No. 2,617,577, dated November 11, 1952, Serial No. 128,760, November 22, 1949. Application for reissue December 29, 1953, Serial No. 401,103

2 Claims. (Cl. 229—15)

Matter enclosed in heavy brackets [ ] appears in the original patent but forms no part of this reissue specification; matter printed in italics indicates the additions made by reissue.

This invention relates to an improved package for articles of merchandise and more particularly to a carton having means for individually supporting articles therein.

In the packaging of merchandise it is often necessary and desirable that the articles being packaged be kept segregated from each other and from contact with the interior surfaces of the carton in order to satisfactorily protect each article. This frequently occurs in the packaging of food stuffs. Bakery products such as cup cakes which have icing or whipped cream must be supported in a package in a manner to prevent the cakes from moving around when the package is being handled so as not to smear the whipped cream or break off the icing. Similarly in the packaging of ice cream tarts having a design molded in their top surface or having whipped cream on their top surface which would be badly smeared were the tarts free to tumble in a carton in which they were shipped, special handling is required.

It is an object of this invention to provide a package wherein articles are individually supported so as to be held in fixed relation to the interior surface of the package when the package is closed. It is yet a further object of this invention to provide such a package for packaging individual tarts and particularly ice cream tarts and it is yet a further object to provide a package which is so constructed that the tarts can be rapidly packaged on an assembly line. Other objects and advantages will be apparent from the following description of my invention.

My improved package comprises a conventional paper carton member and a tray member which is adapted to be inserted within the carton. The tray member is so dimensioned that in the closed carton it remains in fixed position. The tray is provided with means for holding one or more articles, as for example, tarts, when the tray is in the carton that the articles are not only held in fixed spaced relation with respect to each other but they are also secured in fixed relation with respect to the top and bottom of the carton. If the carton were turned over in handling the articles would not substantially change their position.

My invention will be better understood by reference to the following description of a preferred embodiment, and the drawing attached thereto, wherein similar parts are identified by like numerals and wherein.

Figure 1:
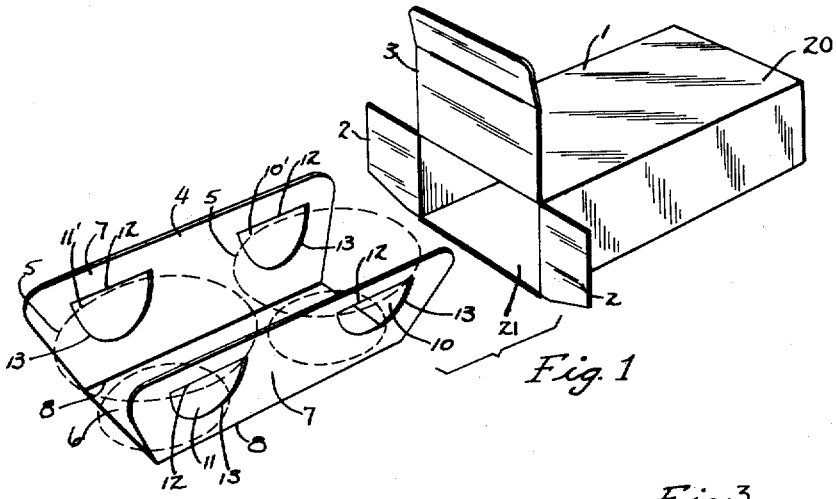
Figure 1 is a perspective view showing my tray and carton prior to assembly with tarts shown in phantom view.
Figure 2:
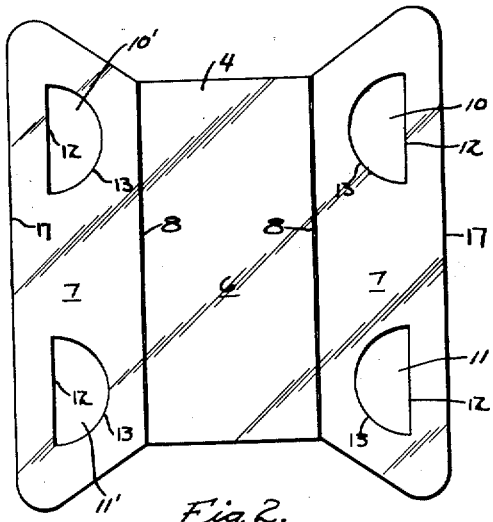
Figure 2 is a plan view of a blank of my tray.
Figure 3:
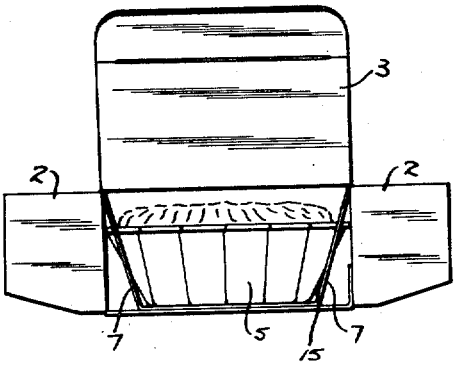
Figure 3 is an end view of my completed package with the end open.

The carton 1 is preferably tubular having a top panel 20, a bottom panel 21, end flaps 2, and closure flaps 3. It is preferably made of paperboard. A tray 4, also preferably of paperboard, is adapted to carry tarts 5, e. g. ice cream tarts, and to hold these tarts within the carton 1 in fixed spaced relation to each other as well as to the interior walls of the carton.

The tray is preferably formed from a single blank suitably cut and scored to provide a main panel or base 6 and side panels or walls 7 joined to the base by suitable parallel score lines 8. In the side walls 7 are pairs of oppositely disposed cut-outs or openings 10—10', and 11—11' defined by top edges 12 and bottom edges 13. The edges 12 are preferably straight and parallel to the base and score lines 8 whereas the bottom edges 13 are substantially circular in form. Each pair of these openings 10—10', 11—11' are arranged to cooperate with each other in supporting the tarts 5 on the tray within the package.

The tarts include a cup 15 which may be made of paper, plastic, metal, or the like, which contains the edible material, e. g. ice cream. The rim 16 of the cup is preferably turned outwardly in the form of a flange.

In the assembly of my package the tray 4 is first flat. The tarts are then set on the base 6 between each pair of openings and the side walls are folded up along score lines 8 to an inwardly inclined position. (See Figure 1.) The rims 16 of the cups 15 extend through the cut-outs 10—10' and 11—11' so that the edges 12 overlie and engage the top surface of the rims 16. The assembly of the tray and the tarts is then inserted into the carton.

Figure 5:
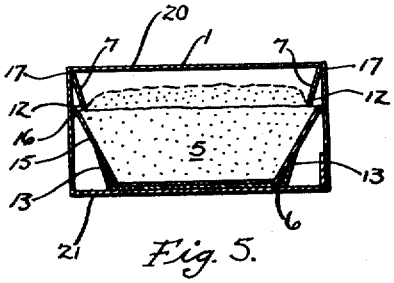
Figure 5 is a section taken along the line 5—5 of Figure 4.
Figure 4:
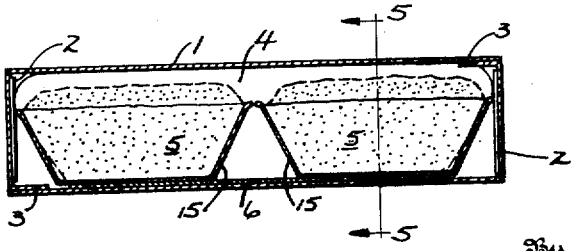
Figure 4 is a longitudinal sectional view of my completed package.

The base of the tray is dimensioned to substantially the same width as the base of the tarts and the side walls 7 of the tray are so dimensioned that the top edges 17 snugly engage the upper corners of the carton and at at the same time assume an inwardly inclined position when the base is resting in face contact with the bottom of the carton (Figure 5). It is thus seen that the carton not only holds the side walls in position about the tarts but also holds the tray in position within the carton. In this way the tarts are held against movement laterally or upwardly by the cut-outs in the side walls of the tray. They are further prevented from touching the top wall of the carton since the tray cannot move upwardly.

The cut-outs may be of any suitable shape to provide an edge which overlies a portion of the articles to be packaged. The tray may be modified in shape depending on the type of carton used. The tray described above is particularly advantageous for high production and low cost operation since it can be shipped flat and formed up in the same operation in which the tarts are slipped into the carton. By dimensioning the tray so that the carton holds it in interlocking arrangement with the articles packaged, the tray construction is simplified.

Many other variations and modifications will be apparent to those skilled in the art and no limitations are intended by the above example except such as are contained in the following claim.

I claim:

1. In combination a rectangular tubular carton having a top wall, a bottom wall, a pair of side walls, and closure flaps at each end thereof, and a tray snugly and telescopically disposed within said carton, said tray having a bottom panel and a pair of side panels hinged along opposite side edges of said bottom panel, said bottom panel being of substantially lesser width than the width of the bottom wall of said carton, each of the side panels of the said tray being upwardly and outwardly inclined from its hinged connection with the bottom panel of said tray and extending to the line of intersection between the side walls respectively and the top wall of said carton into snug disposition within said carton, and a plurality of oppositely disposed openings in the side panels of said tray.

*2. In combination a rectangular carton having a top wall, a bottom wall, a pair of side walls and end walls, and a tray snugly and telescopically disposed within said carton, said tray having a bottom panel and a pair of side panels hinged along opposite side edges of said bottom panel, said bottom panel being of substantially lesser width than the width of the bottom wall of said carton, each of the side panels of the said tray being upwardly and outwardly inclined from its hinged connection with the bottom panel of said tray and extending to the line of intersection between the side walls respectively and the top wall of said carton into snug disposition within said carton, and a plurality of oppositely disposed openings in the side panels of said tray.*

RAY O. TARDIFF.

References Cited in the file of this patent or the original patent

UNITED STATES PATENTS

| Number | Name | Date |
|---|---|---|
| 1,640,452 | Knowlton | Aug. 30, 1927 |
| 1,906,031 | Wilmarth | Apr. 25, 1933 |
| 2,008,335 | Nuyts | July 16, 1935 |
| 2,306,624 | Harris | Dec. 29, 1942 |
| 2,331,038 | Meller | Oct. 5, 1943 |

FOREIGN PATENTS

| Number | Country | Date |
|---|---|---|
| 675,388 | France | Nov. 7, 1929 |